Jan. 26, 1932.  A. VEDRINSKY  1,842,701
HORTICULTURAL SCALDING APPARATUS
Filed Dec. 27, 1928  2 Sheets-Sheet 1
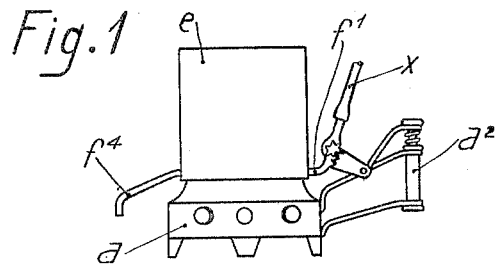
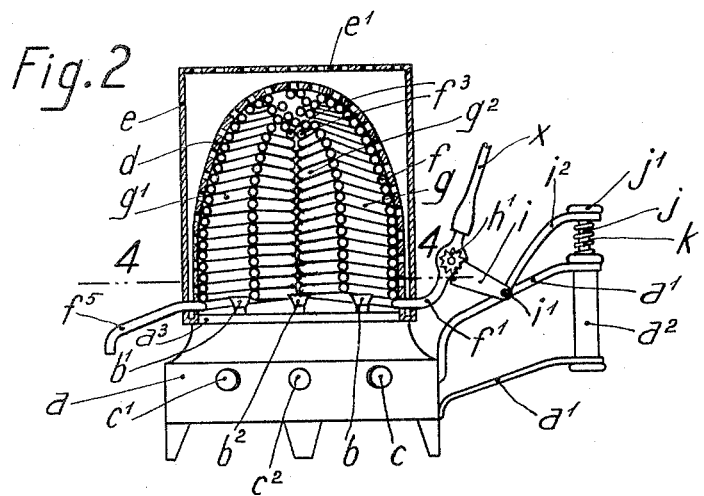
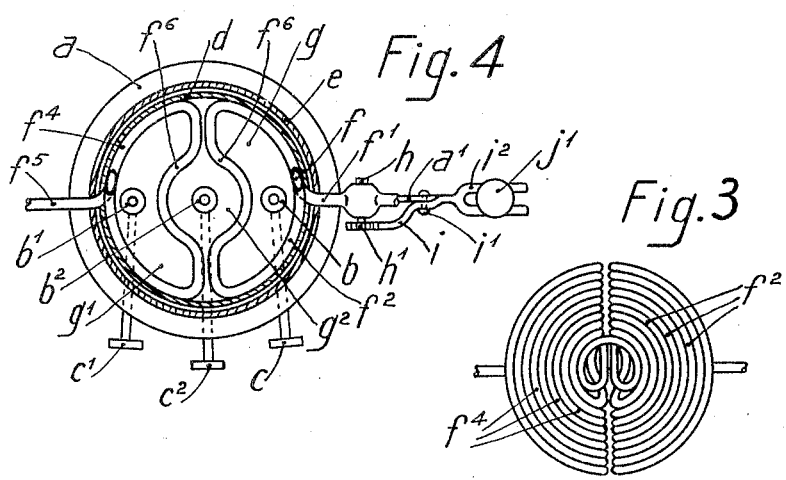
Inventor
ALEXANDRE VEDRINSKY
By Addison G. Armstrong
His Attorney Jan. 26, 1932.                A. VEDRINSKY                1,842,701
                       HORTICULTURAL SCALDING APPARATUS
                    Filed Dec. 27, 1928    2 Sheets-Sheet 2
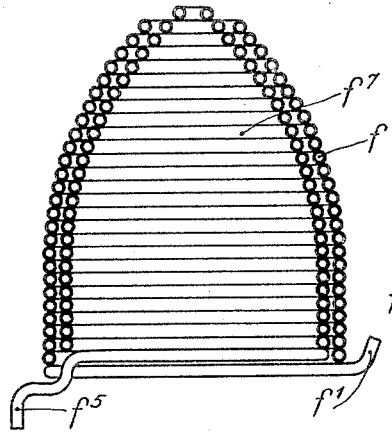
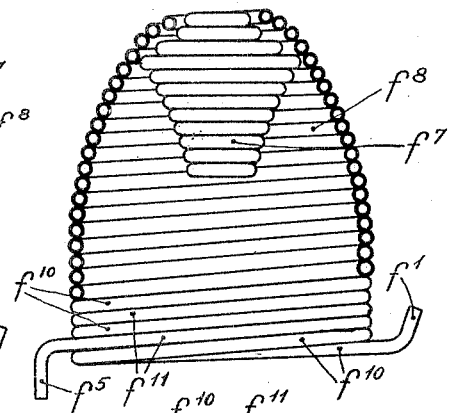
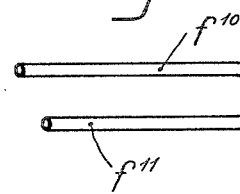
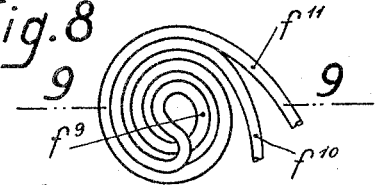
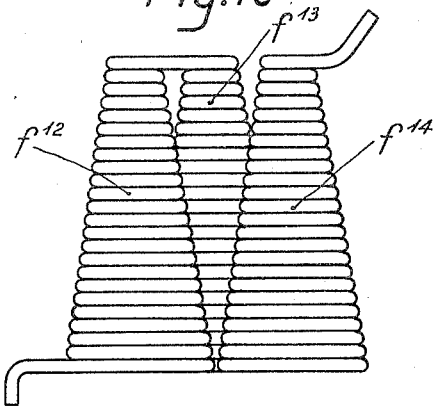
Inventor
ALEXANDRE VEDRINSKY
By Addison A. Armstrong
His Attorney Patented Jan. 26, 1932

1,842,701

UNITED STATES PATENT OFFICE

ALEXANDRE VEDRINSKY, OF PARIS, FRANCE

HORTICULTURAL SCALDING APPARATUS

Application filed December 27, 1928, Serial No. 328,817, and in France January 17, 1928.

My invention relates to a portable apparatus for heating liquids and particularly for scalding vines, trees, and other plants, which operation is known, per se, and is destined to destroy certain insects, worms and injurious larvæ.

It is the object of my invention to provide a pouring apparatus adapted to be easily carried and manipulated by hand, and my apparatus is characterized by the fact that it is provided, on the one hand, with suitable heating organ, of the compressed gas, gasoline, kerosene, alcohol, or analogous type, and on the other hand, with one or more tubular coils communicating with each other, adapted to be heated by the heating organ, and connected on the one hand through an inlet tube with a flexible cold liquid feeding tubing, and on the other hand with a suitable pouring organ, such as a tube or spout for example.

By means of this disposition of parts, the cold liquid runs out either under pressure or by gravity through the flexible feeding tube and then through the inlet tube, circulating through the one or more coils where it begins to boil and from whence it is distributed while in the state of boiling on the plant to be treated, by means of the pouring organ.

One improvement conforming to my invention resides in the fact that on the liquid inlet tube is disposed a cock providing for minimum constant flow and allowing adjustment of the flow of the liquid, the said cock being adapted to be operated by hand or preferably combined with a suitable control organ such as a combination of levers adapted to allow manipulation of the said cock with one of the fingers or the thumb, for example, the hand of the operator grasping the handle of the apparatus and a spring being adapted to tend to return the cock to a position of minimum flow. My device, it is to be understood, is also provided with a stop cock for shutting off completely the flow of liquid independently of the aforementioned cock and rigidly disposed on the tank containing the cold liquid.

My invention will be more readily understood with reference to the accompanying drawings illustrating a number of embodiments of my invention by way of example, and in which:

Fig. 1 is an elevational view of my apparatus;

Fig. 2 is a middle vertical section through Fig. 1;

Fig. 3 is a detail in plan of the coils of my apparatus;

Fig. 4 is a section along the line 4—4 of Fig. 2;

Fig. 5 is a detail view of a modified form of coil;

Fig. 6 is another detail view of a second modified form of coil;

Fig. 7 and Fig. 8 are respectively detail views illustrating the formation of the coil of Fig. 6;

Fig. 9 is a section along the line 9—9 of Fig. 8; and

Fig. 10 is a detail of another modified form of coil.

Referring to the drawings more in detail, the heater $a$ of any suitable form known in the art, is provided with three burners $b$, $b^1$, $b^2$, (Figs. 1 to 4) which are regulated with control valves $c$, $c^1$, $c^2$ as well as two lugs $a^1$ supporting a handle $a^2$. Around the upper part $a^3$ of the burner $a$ are fixed movably in a suitable manner, a dome $d$ of perforate form and an exterior housing $e$ rigidly connected together at their bases and insulated one from the other in the body thereof by a chamber of heat-insulating air. The exterior housing $e$ is closed by a perforate top $e^1$ for allowing the gases of combustion to escape. A double coil composed of a single tube $f$ is disposed in the dome $d$ and is made rigid therewith by suitable means not illustrated, such as by soldering or cramping or like means known in the art. Tube $f$, starting from an inlet portion $f^1$, is laid down in a series of superposed coils having the form shown in Fig. 4 and limiting a chamber $g$ heated by burner $b$. When, in the course of the construction of chamber $g$, tube $f$ reaches the top of the latter, a loop of the type shown in the center of Fig. 3 is made and a series of coils similar in form to those limiting chamber $g$ are wound to form a chamber $g^1$ similar to $g$ and increasing in section from top to bottom. Finally tube $f$ is bent outward to form a discharge portion $f^5$. The heater in its final form consists of two symmetrical chambers $g$ and $g^1$ lying back to back and limited exteriorly and interiorly by walls $f^2$, $f^4$ and $f^6$, $f^6$, respectively, walls $f^8$, $f^6$ bulging away from one another centrally to limit a central chamber $g^2$ heated by burner $b^2$. Water flowing through tube $f$ will therefore be heated by burners $b$ and $b^2$ while moving upward from $f^1$ to the top of the coil through windings $f^2$, $f^6$, and by burners $b^2$ and $b^1$ while descending from the top of the coil to outlet $f^5$ through windings $f^6$, $f^4$. It is to be noted that portions $f^6$, $f^6$ of the coil are simultaneously heated on both sides by burners $b$; $b^2$ and $b^2$, $b^1$. The hereinabove described method of winding tube $f$ insures a maximum of heating surface for a given volume.

The inlet tubing $f^1$ is provided with a cock $h$ for regulating and having a constant minimum flow and rigid with a toothed wheel $h^1$ engaging with a toothed sector $i$. The said sector is pivoted on a stud $i^1$ rigid with the lug $a^1$ and carries a forked arm $i^2$. The said arm fits beneath a push buttom $j^1$ over a rod $j$ slidably mounted in the handle $a^2$. A spring $k$ bearing on the handle $a^2$ and beneath the forked arm $i^2$ pushes the said arm into raised position and hence moves the cock into a position of minimum flow. A flexible tube $x$ connected to the tube $f^1$ serving as an inlet connects with the stop cock of the tank containing the cold liquid (not shown).

Referring to Fig. 5, the coil is constituted by rolling a tube in the form of a dome, first from the bottom to the top, this part being represented by the coil $f^7$ on the inside, and then from the top to the bottom in a winding $f^8$ disposed around said first interior coil, the feeding of the liquid taking place through one of the extremities such as $f^1$ and the drawing off taking place through the other extremity of the tube $f^5$ or vice versa.

The coil illustrated in Figs. 6 to 9 is likewise composed of a single tube and is provided with an interior winding $f^7$ and an exterior winding $f^8$ in the form of a dome. In this embodiment the winding is produced in a manner which will now be described.

The tube is first folded over on itself as in Fig. 7 forming a U-bend $f^9$ and two arms $f^{10}$ and $f^{11}$. The U-bend $f^9$ forming the base of the interior winding $f^7$ (Figs. 8 and 9), the two arms $f^{10}$ and $f^{11}$ of the tube are wound together up to the top of the dome and then caused to descend from top to bottom in a way to establish the exterior winding $f^8$. The two extremities $f^1$ and $f^5$ of the tube form irrespectively either inlet or outlet for the liquid.

In the embodiment of Fig. 10, the tube forms successively three substantially conical coils $f^{12}$, $f^{13}$, $f^{14}$ coupled together and interconnected with each other. In this embodiment of my invention, the tube is first wound from the bottom to the top for forming the coil $f^{12}$, then from top to bottom for forming the coil $f^{13}$ and finally from the bottom to the top for forming the coil $f^{14}$. Each of the conical coils is adapted to cover a burner of the heating organ.

It is to be understood that the modified forms of coils illustrated in Figs. 5 to 10 may or may not be covered with the dome disclosed in connection with the embodiment of Figs. 1 to 4.

Likewise the accessory forms and arrangements of the various members of the devices disclosed, the dimensions, the constituent materials, the details and the means for carrying the invention into practice may be varied without departing from the spirit of the invention as comprehended within the scope of the appended claims.

It is likewise to be understood that the particular forms of coils described and hereinafter claimed may be utilized in connection with the heating of any liquids and all appropriate uses and still come within the scope of the appended claims.

Having described my invention what I claim as new and desire to secure by Letters Patent of the United States of America is:—

1. In a scalding apparatus of the type described, the combination of a portable heater, a single coiled tube adapted to cover said heater, a perforate housing carried by said heater for said coiled tube, an inlet tube formed on one end of said coil extending through said housing, a flexible feeding tube for said inlet tube, a non-closable cock constructed for minimum flow at one position and for maximum flow at another position for regulating the flow of liquid disposed in said inlet tube, pouring means formed on the other end of said coil extending through said housing, a carrying handle on said heater, a pivotally mounted operating lever for said cock carried by said handle, and spring means for returning said cock to a position of minimum flow when said operating lever is released.

2. In a scalding apparatus of the type described, the combination of a portable heater, a single coiled tube adapted to cover said heater, a perforate housing carried by said heater for said coiled tube, an inlet tube formed on one end of said coil extending through said housing, a flexible feeding tube for said inlet tube, a non-closable cock constructed for minimum flow at one position and for maximum flow at another position for regulating the flow of liquid disposed in said inlet tube, pouring means formed on the other end of said coil extending through said housing, a pinion fixed to the tumbler of said cock, a carrying handle on said heater, and manually operable means meshing with said pinion on said handle to regulate the flow of liquid through said inlet tube.

3. In a scalding apparatus of the type described, the combination of a portable heater, a single coiled tube adapted to cover said heater, a perforate housing carried by said heater for said coiled tube, an inlet tube formed on one end of said coil extending through said housing, a flexible feeding tube for said inlet tube, a non-closable cock constructed for minimum flow at one position and for maximum flow at another position for regulating the flow of liquid disposed in said inlet tube, pouring means formed on the other end of said coil extending through said housing, a carrying handle on said heater, a pinion fixed to the tumbler of said cock, a toothed sector meshing with said pinion pivotally mounted on said handle, a forked operating arm projecting from said toothed sector, and a spring-pressed push rod engaged in the fork of said arm for regulating the flow of liquid through said cock.

4. In a scalding apparatus of the type described, the combination of a portable heater, said heater having a plurality of burners, a plurality of superposed layers of spiral windings formed of a continuous tube adapted to cover the burners of said heater, a perforate housing carried by said heater for said coiled tube, an inlet tube formed on one end of said coil extending through said housing, a flexible feeding tube for said inlet tube, a pouring means formed on the other end of said coil extending through said housing, and a carrying handle on said heater.

In testimony whereof I hereunto affix my signature.

ALEXANDRE VEDRINSKY.